May 26, 1970     W. A. CROWLEY ET AL     3,513,936
FLUID BEARING DEVICE WITH SELF-REGULATING ACTION
Filed Sept. 30, 1968
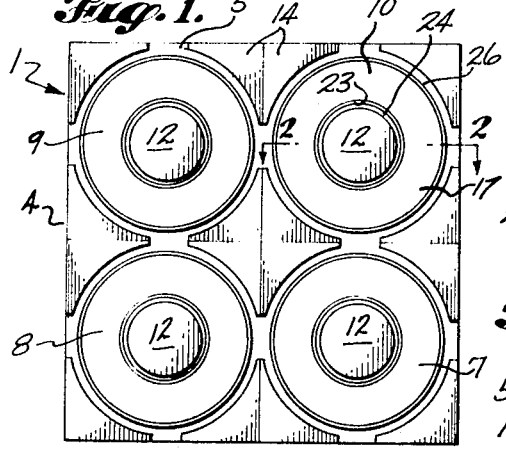
INVENTORS
WALTER A. CROWLEY
KENNETH G. WOOD
BY
Christensen, Sanborn & Matthews
ATTORNEYS

United States Patent Office 3,513,936
Patented May 26, 1970

3,513,936
FLUID BEARING DEVICE WITH SELF-REGULATING ACTION
Walter A. Crowley, Federal Way, and Kenneth G. Wood, Seattle, Wash, assignors to Aero-Go, Inc., Seattle, Wash., a corporation of Washington
Filed Sept. 30, 1968, Ser. No. 763,680
Int. Cl. B60v 1/00
U.S. Cl. 180—124
23 Claims

ABSTRACT OF THE DISCLOSURE

A fluid cushion device is made from flat nonporous sheets providing a minimum thickness when collapsed. The sheets, when inflated, form a torus attached with a fluid tight seal to the lower surface of the platform to define a plenum chamber within the seal and the lowermost extremity of the torus. A fluid supply orifice conducts fluid under pressure through the bottom surface of the platform into the plenum and one of the sheets has defined within it a fluid inlet aperture held in general registry with the fluid supply orifice when the cushion is deflated. Once inflated additional apertures in the torus provide surge pressure regulating outlets from the cushion exiting into the plenum. Large area pads are positioned around the periphery of the torus and within the boundary formed by the inner edges of the sheets to provide a distributed load-bearing support when the torus is deflated without wrinkling or pinching the sheets. For higher pressures and heavier loading, a retainer ring is fastened between the bonded sheet and the platform to provide a structural supplement to the fluid tight seal. The sheets may be overlapped between the retainer ring and the platform, with the joint between the overlapped sheets exposed to the plenum so that any escaping fluid through the joint from within the torus escapes into the plenum and any escaping fluid from the plenum is received into the torus. To resist nonuniform expansion of the sheets under high pressure, the sheets may be formed of laminated plies of nonporous material having the warp of adjacent plies biased from one another.

BACKGROUND OF THE INVENTION

This invention relates to fluid cushion load-supporting devices and more particularly to low profile devices incorporating means for providing flow regulation, load distribution and heavy load-bearing constructions.

DESCRIPTION OF THE PRIOR ART

The use of fluid cushion devices for supporting large loads has a principal advantage of distributing the relatively low pressure of the fluid over a large area of the floor or ground surface over which the device travels while supporting a heavy load on a platform. This is a particular advantage when the floor surface, such as in an aircraft, by its construction will not tolerate high concentrated loads such as might be produced by normal wheels casters and similar supports.

In the patent to Stemple, 3,373,838, an air cushion is used to support a heavy home appliance such as the refrigerator shown. The air bearing is used for supporting the appliance during the time that it is moved in and out of its normal position for cleaning or for other rearrangements. It is noted, however, that adjustable leveling screws 14 are positioned in each bottom corner of the appliance to provide its normal support when the air cushion is deflated. Since these supports have such a small cross-sectional area they often produce dimples in the floor surface and can actually puncture the floor if the surface cannot tolerate such high concentrated loads.

In the patent to Mackie, 3,245,487, a rather complicated valving system is disclosed for regulating the flow of air between the flexible tubular member and the plenum portion of the air caster to accommodate load concentrations on the platform supported by the air cushion device. In the previously mentioned patent to Stemple, 3,373,838, small bleed apertures, positioned around the periphery of the inflatable chamber, are used to regulate the height of the platform by expelling air from the inflated chamber outside of the plenum area once the inflated chamber becomes distorted due to an increased load.

There has been found that the lower pressures and high volumes of air used for air cushions are readily available in many industrial plants. However, for supporting larger, heavier loads requiring higher pressures and higher volumes of fluid, such cushion devices have been generally considered not feasible because the compressor capacity of the plant could not serve such high volume requirements even at a relatively low pressure.

When fluid cushion devices are not in use, their volume is generally reduced due to the deflation of the torus or diaphragm, but ordinarily the structure of the material forming the torus is tube-like and upon deflation does not present a flattened low profile. In addition, the deflation of the torus material often produces wrinkles which in time will produce points of weakness and failure within the torus.

As fluid cushion devices have been tried for carrying higher loads it has been noted that the torus material tends to stretch out of shape yielding wrinkles and other surface discontinuities in the torus producing squeals, an uneven ride for the load being carried and low fluid bearing efficiency.

OBJECTS AND SUMMARY OF THE INVENTION

In view of the inherent limitations and problems related above with regard to the design and utilization of wheelless load carrying systems, it is the principal object of the instant invention to provide a generally improved fluid cushion device suitable for supporting and transporting higher loads than previously carried by air cushion devices.

It is another object of the instant invention to provide a generally improved torus configuration for fluid cushion devices which permits the load carrying torus when deflated to present a minimum profile.

A still further object of the instant invention is to provide a generally improved fluid cushion load carrying device which includes auxiliary support means useful in distributing the load carried by the device when the cushion is deflated without damaging the ground surface.

A still further object of the instant invention is to provide a generally improved fluid cushion load carrying device which includes a torus member incorporating a plurality of plies of nonporous material for providing uniform distortion of the fluid inflated torus yielding increased fluid bearing efficiency.

Another object of the instant invention is to provide a fluid flow system for a fluid cushion load carrying device which utilizes a single intake for inflating the torus while at the same time providing dynamic fluid in the plenum and fluid bearing portion of the device.

A still further object of the instant invention is to provide an improved fluid cushion load carrying device including a simple structure for accommodating surges in pressure due to unusual loading or ground conditions.

A related object of the instant invention is to provide a generally improved fluid cushion device incorporating design features which simplify the manufacturing and storage of the device while improving its general efficiency.

In accordance with the present invention the torus portion of a fluid cushion device is formed by flat nonporous sheets which are sealed together to form a fluid inflatable torus. A fluid tight joint is established between a portion of the sheets and the platform supported by the torus. The interior edges of the sheets define a central area in which is positioned a generally planar pad member having an outside dimension substantially equal to the inside distance spanning between the interior edges of the torus forming sheets. The exterior edges of the torus forming sheets are positioned adjacent to additional planar pad members such that the pad members present a load-bearing surface having a significantly large area, with relation to the load-bearing area of the fluid cushion, for distributing the load carried by the platform over the entire pad area when the torus member is deflated. In addition, the pads are provided with sufficient thickness to accommodate within a low profile the deflated torus sheets between the pad members without wrinkling and pinching them.

A fluid supply inlet is defined in the platform to communicate the fluid supply with the interior chamber bordered by the seal between the torus and the platform. The torus inlet is positioned in general registry with the supply inlet when the torus is deflated. The initial fluid under pressure inflates the torus while the additional fluid from the fluid inlet is shared between the torus and the plenum chamber defined by the inner periphery of the torus as it becomes inflated changing its configuration and moving the torus inlet away from the supply inlet. Pressure surge apertures are defined within the torus sheets permitting exit of surges of pressure from the torus chamber into the plenum chamber. The total area of the exit apertures is greater than the area of the torus inlet aperture.

To provide significant increased strength to the torus structure, permitting the use of higher pressures and fluid mediums such as water, the torus sheets are formed by bonded plies of nonporous material having the weave of adjacent plies offset from one another for increasing the dimensional stability and making more uniform any distortion in the torus. For larger torus devices a retainer ring is used to squeeze the torus sheet at the fluid tight seal zone against the platform. The overlapping of nonporous sheets of the torus between the retainer ring and the platform is arranged so that any fluid leaking between the overlapped sheets will be trapped within the torus or within the plenum chamber rather than escaping to the atmosphere.

These and other features and advantages of the invention will become more clearly apparent from the following detailed description thereof, which is to be read with reference to the accompanying drawings.

BRIEF DESCRIPTION OF THE DRAWINGS

In the drawings:

FIG. 1 is a bottom plan view of a load-bearing platform including pressure fluid load carrying cushions of the present invention;

FIG. 2 is a side section view taken along the line 2—2 of FIG. 1;

FIG. 3 is a top plan view of a single fluid cushion with the platform removed for clarity;

FIG. 4 is a side sectional view taken along line 4—4 of FIG. 3;

FIG. 5 is an exploded perspective view of one form of the instant invention; and FIG. 6 is a side section view similar to FIG. 4 but of a different embodiment of the fluid cushion device in accordance with the present invention.

DESCRIPTION OF THE PREFERRED EMBODIMENTS

As shown in the bottom plan view of FIG. 1, the load carrying device 1 is illustrated as including a backing plate 4 such as a load carrying platform having a bottom surface 5 upon which are mounted fluid bearing casters 7, 8, 9 and 10. These casters are referred to herein as fluid bearing cushions and may be designed to form a variety of plan forms with good results obtained by use of a doughnut or torus plan form. The flexible toroidal inflatable body 17 of caster 10 depends horizontally from bottom surface 5 of backing plate 4 to define with its inner edges 23 a central opening 24. Positioned within central opening 24 and attached to bottom surface 5 is central landing pad 12 depending horizontally from the surface 5 a thickness greater than the collapsed thickness of deflated torus 17. Positioned around the outer edges 26 of torus 17 are corner landing pads 14 of a similar material and thickness to that of central landing pad 12 and also bonded to and depending from bottom surface 5 of backing plate 4.

As shown in FIGS. 2 through 5 cushion or torus 17 is composed of an upper skirt sheet 19 held with a suitable adhesive in a bonded fluid tight sealed relationship, forming a sealing zone 20, with lower surface 5 of platform 4. Lower skirt sheet 21 is bonded to upper skirt sheet 19 at their outer edges 26 which are stitched and reinforced by outer perimeter binding 28 in the form of a web-like material. A fluid tight seal is ensured at this juncture by the use of an outer perimeter seal ring 30 which may be formed of a rubber-like material vulcanized within the torus chamber 31 opposite outer perimeter binding 28. The inner edges 23 of upper and lower skirt sheets 19 and 21 are likewise stitched and bound together in a fluid tight seal which is reinforced by inner perimeter binding tape 37. Thus formed the upper and lower skirt sheets 19 and 21 define an inflatable torus 17 having a non-inflated flat profile such as shown in dashed lines in FIG. 4 completely protected by the central and corner landing pads 12 and 14 so as not to pinch the fabric forming the skirt sheets 19 and 21.

A plenum chamber 38 is defined by the inner periphery of torus 17, bottom surface 5 within seal zone 20, the surface of the central landing pad 12, and the lowermost extremity 46 of lower sheet 21 adjacent the floor surface 16. A supply of fluid under pressure is transmitted in a conventional manner, therefore not shown, to the fluid supply inlet 40 defined in backing plate 4 as it forms a fluid communication through plate 4 into plenum chamber 38. As shown in dashed lines in FIG. 4, the torus inlet aperture 42, defined in the upper skirt sheet 19, is positioned in general registry with fluid supply inlet 40 when torus 17 is in its collapsed form. Also defined within the portion of upper skirt 19 extending from the seal zone 20 to inner edge 23 are a series of surge outlet apertures 44 which permit communication of the fluid under pressure between torus chamber 31 and plenum chamber 38. With such an inlet and aperture arrangement it is possible to inflate torus chamber 31 partially before a load is supported by cushion 10 by the expanding configuration of torus 17 away from surface 5. At the outset fluid under pressure is communicated from fluid supply inlet 40 directly through torus inlet aperture 42 into chamber 31. As the configuration of torus 17 becomes more rounded, the portion of upper skirt sheet 19 between seal zone 20 and the inner edge 23 pulls away from bottom surface 5 of backing plate 4, forming a sepandrel-like space 38' therebetween and permitting the fluid under pressure from supply inlet 40 to be shared between plenum chamber 38 and torus chamber 31. As the pressure builds up in plenum chamber 38 and torus chamber 31 the bearing seal between the lowest extremity 46 of skirt sheet 21 and floor surface 16 is broken and a perimetrical throttling gap 48 is developed which permits fluid bearing flow allowing frictionless motion between platform 4 and ground surface 16 as long as the throttling gap 48 is maintained through a continuous supply of the fluid under pressure from fluid supply inlet 40. As unbalanced loads or uneven floor surfaces are experienced, an increase of the fluid supply from plenum chamber 38 out through the throttling gap 48 is required. With previously used valving systems such an increase of supplied fluid might cause an increase in the pressure within torus chamber 31 causing additional stiffness and perhaps grounding out of caster 10, by elimination of the throttling gap 48, before the increased fluid under pressure could be supplied to plenum chamber 38 and the throttling gap 48. However, with the instant structural arrangement, skirt surge outlets 44, have an aggregate volume exceeding the volume of skirt inlet aperture 42 and thereby permit a quick means of pressure equalization and communication for the fluid under pressure between torus chamber 31 and plenum chamber 48, to provide a self-regulating action.

To enhance the strength of the seal between torus 17 and the backing plate 4, a clamping ring 50 may be positioned within torus chamber 31 and tightly fastened by suitable fastening means 52 to the backing plate 4 to squeeze upper skirt sheet 19 firmly and securely against bottom surface 5 in sealing zone 20. With this construction caster 10 has the ability to withstand sudden abutments and ridges on the floor without breaking the fluid tight seal with surface 5.

In a typical use application for fluid cushion casters similar in construction to those shown in FIGS. 1 to 5, is has been found that a combination of nonporous 32 ounce neoprene-nylon fabric is suitable for torus skirts 19 and 21. A one inch wide nylon tape webbing having 2,500 pounds tensile strength is used for the outer perimeter binding tape 28 and a two inch wide 4-way twill nylon tape webbing, having 5,000 pounds tensile strength, is used for the inner perimeter binding tape 37. For a caster having a twelve inch outside diameter, a one inch sealing zone 20 is adequate with torus inlet aperture 42 having a diameter of one-half inch with thirty-two ⅛ inch diameter surge outlets 44 positioned around the inner periphery of torus 17. Landing and corner pads 12 and 14 can be made of rubber material having a 60 durometer and 2,400 p.s.i. tensile strength with a surface area of approximately 20% of the equivalent load-bearing area of the fluid caster 10. With this ratio of surface area between the pads and caster, it is possible to distribute the load from the backing plate 4 through the pads without concentrating the load when the torus 17 is deflated. Greater area for corner landing pads 14 may be provided if there is sufficient area available on supporting surface 5 of backing plate 4. By positioning central landing pad 12 within the plenum chamber 38 the span between supports for backing plate 4 is reduced when the torus 17 is deflated, thereby eliminating the surface distortion and load concentrations which are caused by large unsupported spans of backing plate 4.

As shown in FIG. 6, a second embodiment 61 of a suitable fluid caster is illustrated in a view similar to that shown in FIG. 4 for the first embodiment 10. For this reason similar numbers are used for similar structural members. In this embodiment the caster 61 has been reinforced generally to increase its load carrying capacity and to reduce the fluid losses and resulting bearing inefficiencies caused by wrinkles and nonuniform expansion of torus 63. The fabric for the lower skirt member 65, the inner skirt member 66 and upper skirt member 67 is increased in its strength by using a laminated multi-ply nonporous material having the warp of adjacent plies positioned at an angle from one another, such as 45°, to increase the dimensional stability of caster 61 as it becomes inflated with greater pressures for carrying greater loads than the single ply caster 10 previously described. It has been found in comparison tests that a twenty-one inch outside diameter caster having a construction similar to that shown in FIGS. 1 to 5 utilizes approximately 5 cubic feet of air per minute in maintaining the air bearing with 18 pounds per square inch pressure at the throttling gap 48. This is to be compared with a double ply version of a twenty-one inch diameter bearing made in accordance with the construction shown in FIG. 6, utilizing the oblique relationship between the warp of adjacent plies of the skirt fabric, to produce the same load carrying capability with only 3 cubic feet of air per minute used. It is the uniformity of expansion and therefore the lack of wrinkles in the skirt material adjacent to the ground level 16 which apparently produces the increased efficiency of second embodiment caster 61 as compared to first embodiment caster 10. It has also been found that by utilization of the second embodiment caster construction it is possible to significantly increase the load carrying capacity of a cushion air bearing caster through the increase of pressure of the fluid. An operating pressure of 55 pounds per square inch, utilizing water as the fluid under pressure, provides a significant increase in load carrying capacity for fluid bearing pallets and permits the utilization of normal water supply pressure available at most plant sites. This eliminates the need for high volume air compressors and is particularly well suited for use in carrying large structural parts from one work position to another in a shipyard.

In more detail it is noted from FIG. 6 that inner skirt sheet 66 is overlapped at joint 72 with upper skirt sheet 67 in the sealing zone 70 and these overlapped sheets are clamped between clamping ring 50 and bottom surface 5. This sequence of overlap between sheets 66 and 67 increases the fluid integrity of caster 61 since any fluid escaping from plenum chamber 38 through joint 72 enters into torus chamber 31 and any fluid under pressure passing from torus chamber 31 through joint 72 will enter into the plenum chamber 38. It is therefore seen that the sequence of overlap with upper skirt sheet 67, which is exposed to the exterior of caster 61 positioned immediately adjacent bottom surface 5 of backing plate 4, and inner sheet 66, positioned adjacent the lower surface of the upper sheet 67 and in immediate contact with clamping ring 50, produces a stronger more leak proof construction.

Although some tests have shown that the relative positions between supply inlet 40 and torus inlet 42 need not always be in registry, overall results indicate that these inlets should be in general registry for trouble-free operation. On some tests the supply inlet was positioned in the center of central pad 12 and proper inflation of the torus and formation of the fluid bearing occurred between the lowermost extremity of the torus and the ground. In other tests, with a similar supply to torus inlet relationship, the temporary seal between the torus and ground surface failed to be maintained long enough to properly inflate the torus such that a proper fluid bearing could not be established. Because of the variety of variables involved, including torus size, stiffness of the torus sheets, distance between the platform to torus seal and the inlets, relative radial positions of the inlets, orifice design of the supply inlet, but to name a few; it is difficult to state what range of nonalignment between the supply and torus inlets could be used without producing unreliable results. It is believed clear however that those skilled in the art could easily determine with rather straightforward tests the range of nonalignment for producing satisfactory results with any particular set of variables. For this reason the claims refer to "general registry" to include direct alignment and other spacial relationships between the supply and torus inlet openings which produce reliable torus inflations and fluid bearing formations.

We claim:

1. A fluid bearing cushion load-supporting device comprising: means defining a platform; means defining a flexible walled torus depending from a fluid tight seal with one surface of said platform; a plenum defined by said torus between said seal and the lowermost extremity of said torus; means supplying fluid under pressure directly into said plenum; and opening means defined by a portion of said torus bordering said plenum in general registry with said fluid supply means for communicating said fluid under pressure between said plenum and the interior of said torus for inflating said torus elevating said platform; said platform defining a supply inlet for said fluid supply means opening into said plenum; and said torus opening and said supply inlet being positioned in registry for directly receiving said fluid into said torus in said deflated position and for sharing said fluid with said plenum in said inflated position.

2. In a fluid bearing cushion load-supporting device having a load-supporting platform member, an inflatable torus depending from one surface of said platform and a fluid supply inlet supplying fluid under pressure into the plenum chamber bounded by said torus, the improvement comprising: said torus including flat nonporous sheets sealed along their inner and outer edges to contain said fluid with one portion of said sheets sealed in fluid tight relationship with said one platform surface; a second portion of said sheets bordering said plenum being movable from a deflated position in close contact with said supply inlet to an inflated position spaced from said supply inlet; said second portion defining torus inlet aperture means positioned in general registry with said supply inlet for directly receiving said fluid into said torus in said deflated position and for sharing said fluid with said plenum in said inflated position; and a retainer ring means positioned within and extending along said torus and secured to said platform for clamping said sealed portion of said sheet against said one platform surface.

3. In combination, a platform for traveling over a surface therebelow, and an annular body which is interposed in a horizontal plane between the platform and the surface and characterized with a flexible hollow double-walled construction which is inflatable to form a torus for raising the platform above the surface, there being a circumferentially closed fluid-tight connection between the platform and the opposing upper wall of the body which is spaced radially outwardly from the inner peripheral edge of the upper wall to enable the inner peripheral portion of said upper wall to separate from the platform when the body is inflated, and openings in the platform and the inner peripheral portion of said upper wall which are in substantial vertical registry with one another so that a pressurized fluid fed through the opening in the platform, flows simultaneously into the body, and into the plenum defined by the platform and the inner peripheral upper wall portion of the body, as the torus is formed, the inner peripheral upper wall portion of the body also having additional openings therein through which fluid can escape from the torus into the plenum, and the additional openings being radially inwardly offset from the first mentioned opening in the torus.

4. In combination, an annular body which is hollow and has flexible upper and lower annular shaped walls so as to be inflatable to form a torus, and a rigid backing member which is disposed opposite one of the aforesaid flexible annularly-shaped walls of the body and interconnected with the body around the entire circumference thereof so as to form a plenum within the opening defined by the torus when the body is inflated, the aforesaid interconnection between the body and the backing member being radially outwardly spaced from the inner peripheral edge of the body, between the aforesaid one wall of the body and the backing member, so that on inflation of the body, the inner peripheral edge portion of the one wall is free to separate from the backing member to form a spandrel-like space therebetween which is in open communication with the plenum at the adjacent inner and outer peripheries thereof, respectively, and there being an opening in the backing member spaced radially inwardly from the aforesaid interconnection, and an opening in the aforesaid inner peripheral one wall edge portion of the body, which are cooperatively disposed so that when the body is in a deflated condition and a stream of pressurized fluid is fed through the opening in the backing member, initially the major portion of the stream is discharged into the body through the opening therein, to inflate the body and to from the aforesaid spandrel-like space between the body and the backing member, and thereafter is discharged into the spandrel-like space itself for pressurization of the plenum so that the torus can operate as a fluid bearing.

6. The combination according to claim 4 wherein the spandrel-like space is openly exposed to the plenum about the entire inner periphery thereof, so as to form a part of the plenum.

6. The combination according to claim 4 wherein the opening in the backing member is disposed opposite the spandrel-like space in plan view, and the opening in the inner peripheral one wall edge portion of the body is in vertical registry therewith.

7. The combination according to claim 4 wherein the inner peripheral one wall edge portion of the body has a plurality of openings therein.

8. The combination according to claim 7 wherein the openings in the inner peripheral one wall edge portion of the body are spaced about the circumference of the body.

9. The combination according to claim 7 wherein the opening in the backing member is disposed opposite the spandrel-like space in plan view, and one of the openings in the inner peripheral one wall edge portion of the body is radially outwardly spaced from the remaining openings therein, and in vertical registry with the opening in the backing member.

10. The combination according to claim 4 wherein the other of the aforesaid flexible annularly-shaped walls of the body is imperforate.

11. The combination according to claim 4 wherein the backing member has a rigid pad thereon which projects therefrom through and beyond the opening defined by the body when the body is in a deflated condition, but which lies wholly within the opening defined by the torus when the body is in an inflated condition.

12. The combination according to claim 11 wherein the opening in the backing member is disposed adjacent the outer peripheral edge of the pad.

13. In combination, an annular body which is hollow and has flexible upper and lower annularly-shaped walls so as to be inflatable to form a torus, a rigid backing member which is disposed opposite one of the aforesaid flexible annularly-shaped walls of the body and interconnected with the body around the entire circumference thereof so as to form a plenum within the opening defined by the torus when the body is inflated, the aforesaid interconnection between the body and the backing member being radially outwardly spaced from the inner peripheral edge of the body, between the aforesaid one wall of the body and the backing member, so that on inflation of the body, the inner peripheral edge portion of the one wall is free to separate from the backing member to form a spandrel-like space therebetween which is in open communication with the plenum at the adjacent inner and outer peripheries thereof, respectively, there being an opening in the aforesaid inner peripheral one wall edge portion of the body, and means operative at a point spaced radially inwardly from the aforesaid interconnection, to discharge a stream of pressurized fluid into the body through said opening, to inflate the body and thereby form the aforesaid spandrel-like space between the body and the backing member, and operative thereafter on inflation of the body, to discharge a stream of pressurized fluid into the spandrel-like space itself for pressurization of the plenum so that the torus can operate as a fluid bearing.

14. In combination, an annular body which is hollow and has flexible upper and lower angularly-shaped walls so as to be inflatable to form a torus, a rigid backing member which is disposed opposite one of the aforesaid flexible annularly-shaped walls of the body and interconnected with the body around the entire circumference thereof so as to form a plenum within the opening defined by the torus when the body is inflated, the aforesaid interconnection between the body and the backing member being radially outwardly spaced from the inner peripheral edge of the body, between the aforesaid one wall of the body and the backing member, so that on inflation of the body, the inner peripheral edge portion of the one wall is free to separate from the backing member to form a spandrel-like space therebetween which is in open communication with the plenum at the adjacent inner and outer peripheries thereof, respectively, and means for inflating the body and pressurizing the plenum so that the torus can operate as a fluid bearing, including a fluid supply inlet in the aforesaid inner peripheral one wall edge portion of the body, and means operatively disposed radially inwardly from the aforesaid interconnection, in the backing member, to discharge a stream of pressurized fluid into the aforesaid spandrel-like space between the body and the backing member upon inflation of the body.

15. In a fluid bearing device having an annular body which is hollow and has flexible upper and lower annularly-shaped walls so as to be inflatable to form a torus, and a rigid backing member which is disposed opposite one of the aforesaid flexible annularly-shaped walls of the body and interconnected with the body around the entire circumference thereof so as to form a plenum within the opening defined by the torus when the body is inflated, the improvement wherein the body has an annular retainer ring therein and the interconnection between the body and the backing member is formed by clamping the aforesaid one wall of the body between the retainer ring and the backing member to form a fluid tight connection.

16. The fluid bearing device according to claim 15 wherein the one wall of the body is formed by a pair of flexible sheets having overlapping edges which are clamped between the retainer ring and the backing member to form the outer and inner peripheral portions of the wall.

17. The fluid bearing device according to claim 16 wherein the overlapping edge of the outer peripheral sheet is disposed adjacent the backing member.

18. In a fluid bearing cushion load-supporting device having a load-supporting platform member, an inflatable torus depending from one surface of said platform and a fluid supply inlet supplying fluid under pressure into the plenum chamber bounded by said torus, the improvement comprising: said torus including flat nonporous sheets sealed along their inner and outer edges to contain said fluid with one portion of said sheets sealed in fluid tight relationship with said one platform surface; a second portion of said sheets bordering said plenum being movable from a deflated position in close contact with said supply inlet to an inflated position spaced from said supply inlet; said second portion defining torus inlet aperture means positioned in general registry with said supply inlet for directly receiving said fluid into said torus in said deflated position and for sharing said fluid with said plenum in said inflated position; said sheets being formed of a laminated fabric having adjacent plies thereof positioned with the warp of each adjacent ply extending at an angle from the warp of the next adjacent ply; and said laminated sheets having two plies with the angle between the warps of adjacent plies equal to 45°.

19. In a fluid bearing cushion load-supporting device having a load-supporting platform member, an inflatable torus depending from one surface of said platform and a fluid supply inlet supplying fluid under pressure into the plenum chamber bounded by said torus, the improvement comprising: said torus including flat nonporous sheets sealed along their inner and outer edges to contain said fluid with one portion of said sheets sealed in fluid tight relationship with said one platform surface; a second portion of said sheets bordering said plenum being movable from a deflated position in close contact with said supply inlet to an inflated position spaced from said supply inlet; said second portion defining torus inlet aperture means positioned in general registry with said supply inlet for directly receiving said fluid into said torus in said deflated position and for sharing said fluid with said plenum in said inflated position; said torus sheets being three in number with the inner edge of the lower sheet sealed to the inner edge of the inner sheet and the outer edge of said lower sheet being sealed to the outer edge of the upper sheet; and said inner and upper sheets being overlapped at the portion of said torus sealed to said platform forming a joint between said sheets wherein said upper sheet is positioned in contact with said one platform surface and said inner sheet is positioned in contact with the lower surface of said upper sheet.

20. The device of claim 19 including:
a retainer ring member extending within said torus in a clamping relationship with said overlap formed between said inner and upper sheets for clamping said sheets against said one platform surface.

21. In combination, a platform for traveling over a surface therebelow, and an annular body which is interposed in a horizontal plane between the platform and the surface and characterized with a flexible hollow double-walled construction which is inflatable to form a torus for raising the platform above the surface, there being a circumferentially closed fluid-tight connection between the platform and the opposing upper wall of the body which is spaced radially outwardly from the inner peripheral edge of the upper wall to enable the inner peripheral portion of said upper wall to separate from the platform when the body is inflated, and openings in the platform and the inner peripheral portion of said upper wall which are in substantial vertical registry with one another so that a pressurized fluid fed through the opening in the platform, flows simultaneously into the body, and into the plenum defined by the platform and the inner peripheral upper wall portion of the body, as the torus is formed, the body having an annular retainer ring therein and the fluid-tight connection between the platform and the body being formed by clamping the upper wall of the body between the platform and the retainer ring.

22. The combination according to claim 21 wherein the upper wall is formed by a pair of flexible sheets having overlapping edges which are clamped between the platform and the retainer ring to form the outer and inner peripheral portions of the wall.

23. The combination according to claim 22 wherein the overlapping edge of the outer peripheral sheet is disposed adjacent the platform.

References Cited

UNITED STATES PATENTS

| | | | |
|---|---|---|---|
| 3,161,247 | 12/1964 | Mackie | 180—124 |
| 3,211,246 | 10/1965 | Lewis | 180—127 |
| 3,228,294 | 1/1966 | Hickman | 180—116 X |
| 3,246,711 | 4/1966 | Snoeyenbos | 180—124 X |
| 3,247,921 | 4/1966 | Latimer-Needham et al. | 180—124 |
| 3,251,430 | 5/1966 | Veryzer | 180—119 |
| 3,253,667 | 5/1966 | Mackie | 180—124 |
| 3,260,322 | 7/1966 | Mackie | 180—124 |
| 3,327,799 | 6/1967 | Guienne et al. | 180—124 |
| 3,416,626 | 12/1968 | Nagamatsu | 180—124 |

FOREIGN PATENTS

| | | |
|---|---|---|
| 48,801 | 9/1966 | Germany. |
| 782,892 | 4/1968 | Canada. |

A. HARRY LEVY, Primary Examiner